US012619703B2

(12) United States Patent
Maxim et al.

(10) Patent No.:    US 12,619,703 B2
(45) Date of Patent:    May 5, 2026

(54) AUTHORIZED REMOTE MOBILE DEVICE MANAGEMENT OF A TARGETED MANAGED DEVICE

(71) Applicant: JAMF Software, LLC, Minneapolis, MN (US)

(72) Inventors: Aaron Maxim, Seattle, WA (US); Adam Mahmud, Minneapolis, MN (US); Christopher Ball, Leander, TX (US); Jonathan William Yuresko, Union, NJ (US); Tim Knox, Saint Paul, MN (US)

(73) Assignee: JAMF Software, LLC, Minneapolis, MN (US)

( * ) Notice: Subject to any disclaimer, the term of this patent is extended or adjusted under 35 U.S.C. 154(b) by 235 days.

(21) Appl. No.: 17/823,417

(22) Filed: Aug. 30, 2022

(65) Prior Publication Data

US 2024/0070256 A1      Feb. 29, 2024

(51) Int. Cl.
*G06F 21/44*      (2013.01)
*G06F 21/45*      (2013.01)

(52) U.S. Cl.
CPC .............. *G06F 21/44* (2013.01); *G06F 21/45* (2013.01); *G06F 2221/2141* (2013.01); *G06F 2221/2143* (2013.01)

(58) Field of Classification Search
CPC .. G06F 21/44; G06F 21/45; G06F 2221/2141; G06F 2221/2143
See application file for complete search history.

(56) References Cited

U.S. PATENT DOCUMENTS

| | | | | |
|---|---|---|---|---|
| 10,645,570 B1* | 5/2020 | Venkatachalam | ..... | H04W 8/245 |
| 2007/0136087 A1* | 6/2007 | Yamaguchi | ........ | G06Q 10/0637 |
| | | | | 358/1.15 |
| 2008/0141003 A1* | 6/2008 | Baker | ................... | G06F 16/289 |
| | | | | 712/E9.016 |
| 2015/0073998 A1* | 3/2015 | Alsina | .................... | G06Q 20/12 |
| | | | | 705/75 |
| 2015/0170164 A1* | 6/2015 | Marsico | ............. | G06Q 30/0201 |
| | | | | 235/375 |
| 2021/0377323 A1* | 12/2021 | Cheng | ................. | H04L 65/1069 |

(Continued)

*Primary Examiner* — Farid Homayounmehr
*Assistant Examiner* — Brian William Avery
(74) *Attorney, Agent, or Firm* — Benesch Friedlander Coplan & Aronoff LLP

(57)    ABSTRACT

In certain aspects of the present disclosure, a computer-implemented includes generating a unique code for display on a managed device, and authorizing a manager device to selectively initiate at least one workflow on the managed device. The method includes, responsive to the manager device scanning the unique code, verifying the manager device is authorized. The method includes displaying on the manager device, based on verification that the manager device is authorized, an option corresponding to the at least one workflow. The method includes receiving, from the manager device, a selected workflow. The method includes, responsive to receiving the selected workflow, transmitting a message to a push notification server initiating the managed device to communicate with an MDM server. The method includes transmitting a command to the managed device causing performance of the selected workflow on the managed device. Systems and machine-readable media are also provided.

18 Claims, 9 Drawing Sheets

300 ⟍

310 ⟍
Generate a unique code for display on a managed device

312 ⟍
Authorize a manager device to selectively initiate at least one workflow on the managed device 314 ⟍
Responsive to the manager device scanning the unique code displayed on the managed device, verify the manager device is authorized to selectively initiate at least one workflow on the managed device 316 ⟍
Display on the manager device, based on verification that the manager device is authorized, an option corresponding to the at least one workflow 318 ⟍
Receive, from the manager device, a selected workflow corresponding to the option selected from the at least one workflow 320 ⟍
Responsive to receiving the selected workflow, transmit a message to a push notification server, wherein the message initiates the managed device to communicate with a mobile device management server 322 ⟍
Transmit, in response to the managed device communicating with the mobile device management server, a command to the managed device causing performance of the selected workflow on the managed device

(56)     References Cited

U.S. PATENT DOCUMENTS

| | | | | |
|---|---|---|---|---|
| 2022/0068078 | A1* | 3/2022 | Schmidt | G06Q 20/202 |
| 2022/0092156 | A1* | 3/2022 | Maxim | H04L 67/025 |
| 2022/0147199 | A1* | 5/2022 | Mathews | G06F 40/103 |
| 2022/0197306 | A1* | 6/2022 | Cella | B29C 64/386 |
| 2022/0237673 | A1* | 7/2022 | Muthraja | G06Q 20/405 |

* cited by examiner

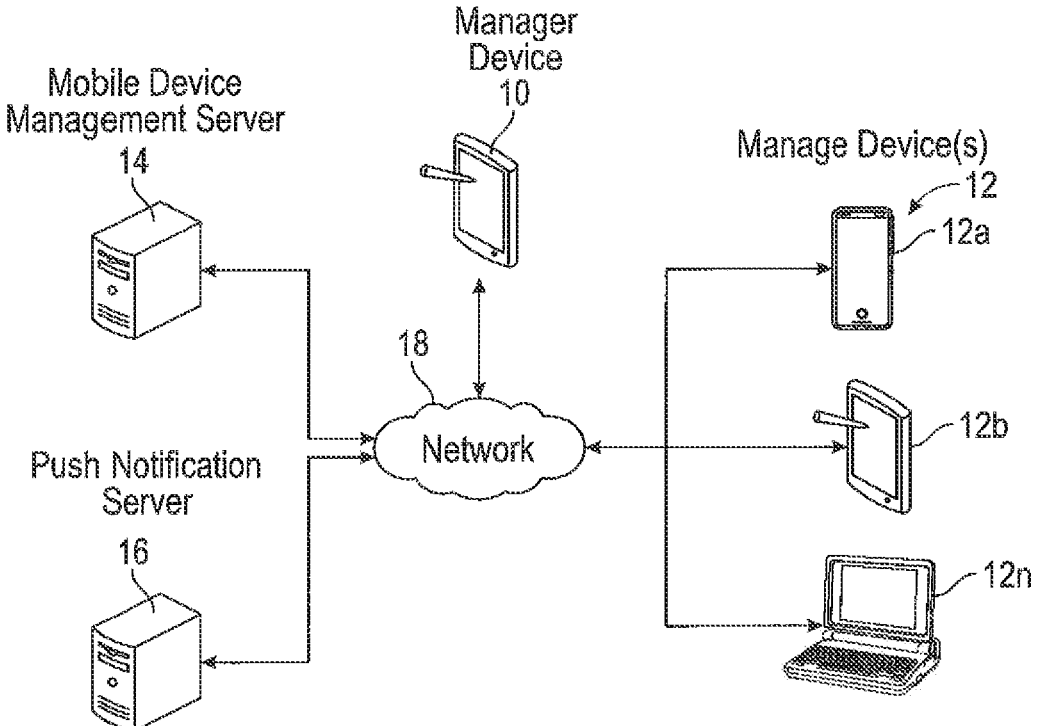
FIG. 1

300

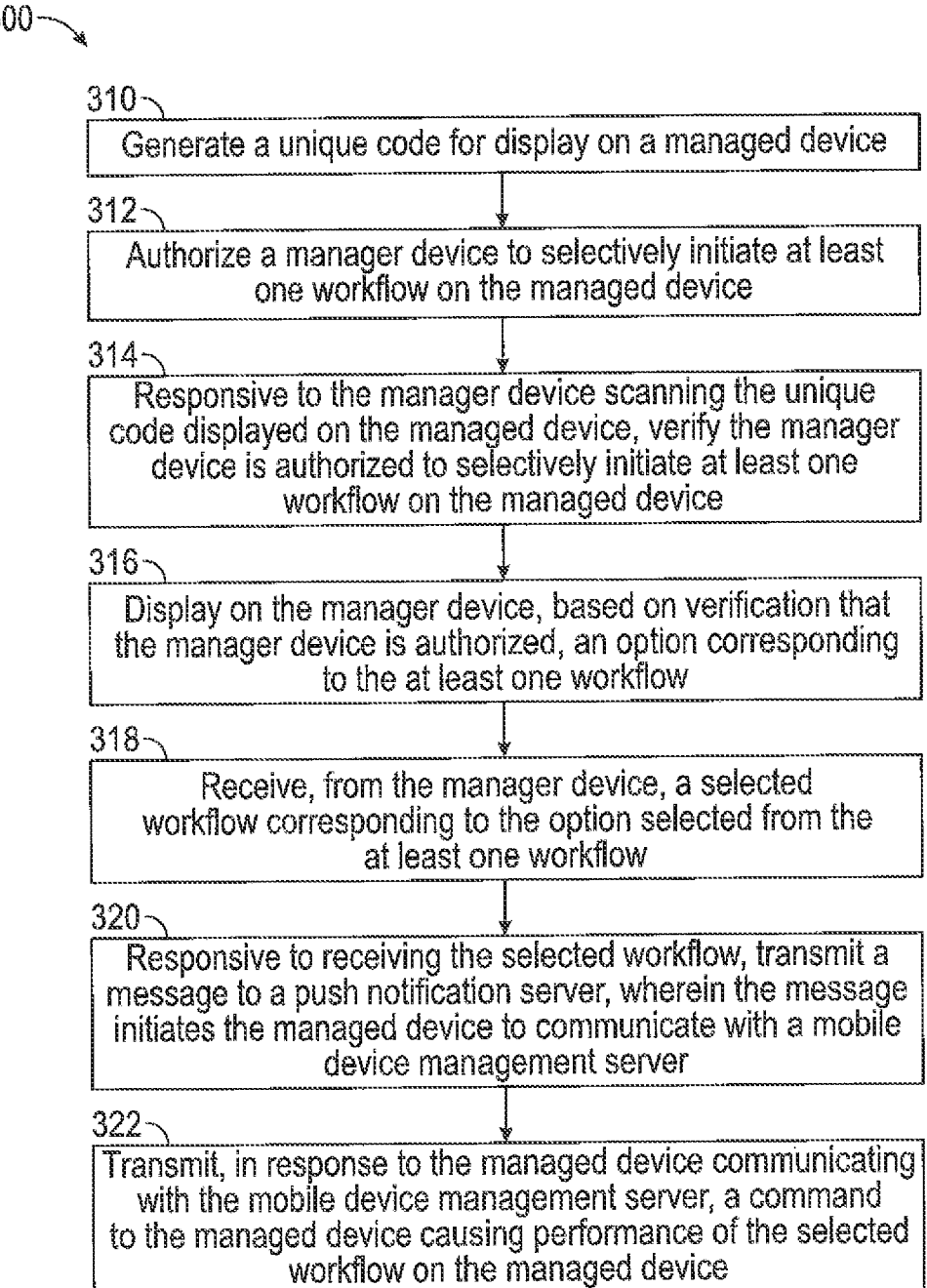

310
Generate a unique code for display on a managed device

312
Authorize a manager device to selectively initiate at least one workflow on the managed device 314
Responsive to the manager device scanning the unique code displayed on the managed device, verify the manager device is authorized to selectively initiate at least one workflow on the managed device 316
Display on the manager device, based on verification that the manager device is authorized, an option corresponding to the at least one workflow 318
Receive, from the manager device, a selected workflow corresponding to the option selected from the at least one workflow 320
Responsive to receiving the selected workflow, transmit a message to a push notification server, wherein the message initiates the managed device to communicate with a mobile device management server 322
Transmit, in response to the managed device communicating with the mobile device management server, a command to the managed device causing performance of the selected workflow on the managed device

FIG. 3

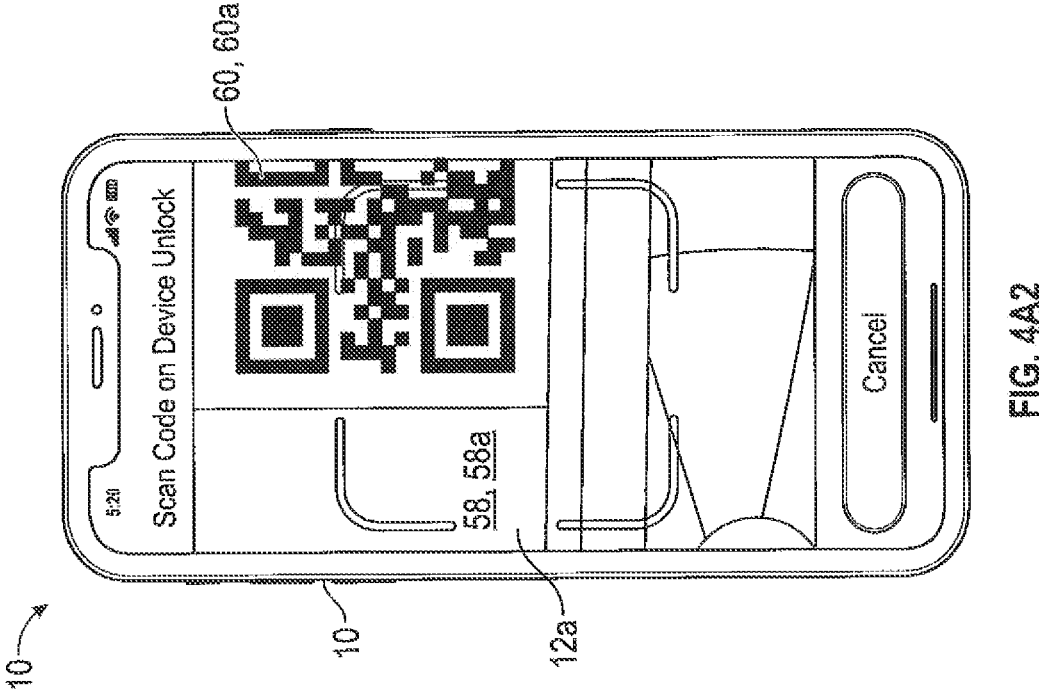
FIG. 4A2
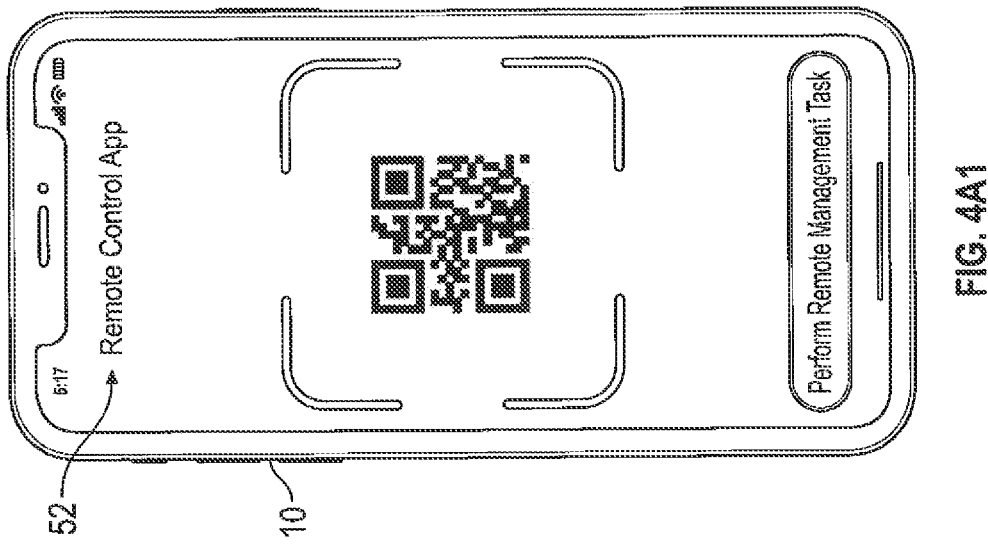
FIG. 4A1

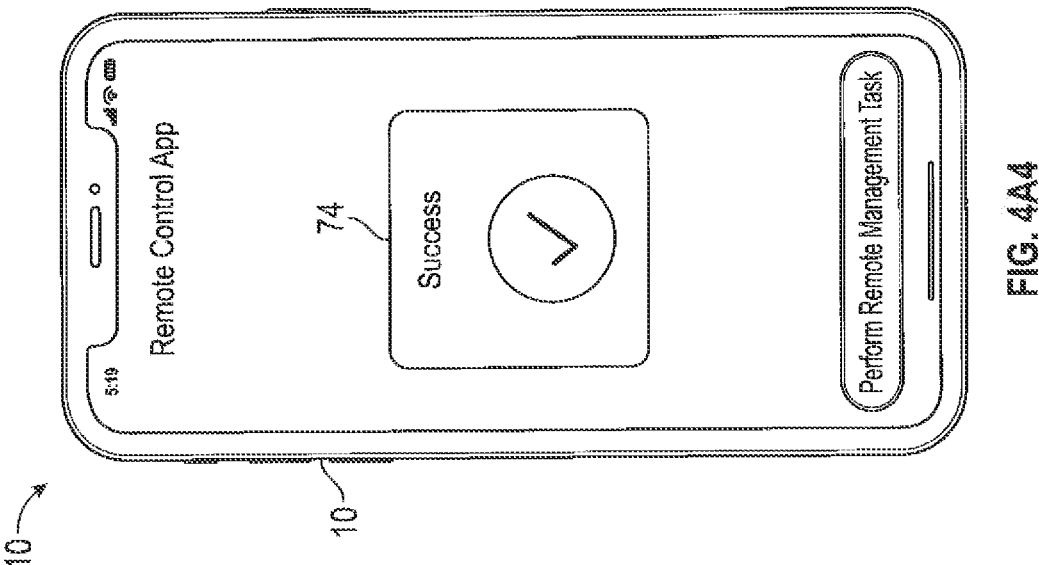
FIG. 4A4
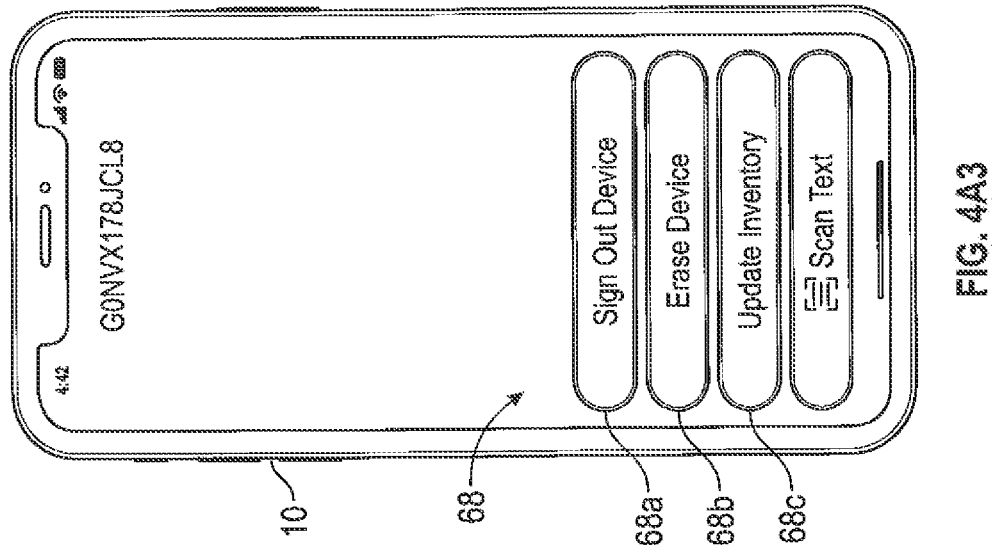
FIG. 4A3

AUTHORIZED REMOTE MOBILE DEVICE MANAGEMENT OF A TARGETED MANAGED DEVICE

TECHNICAL FIELD

The present disclosure generally relates to mobile devices and management systems, and more specifically relates to authorized remote mobile device management of a targeted managed device.

BACKGROUND

Within various organizations, there exists a group of mobile device users or managers who need access to basic mobile device management capabilities over a separate group of managed devices while in the field or on the go. In certain instances while in the field, these managers may need to resolve an issue on a managed device, such as, but not limited to, unlocking the managed device. Under conventional conditions, however, these managers need to submit an IT ticket to an IT administrator to resolve the issue on the managed device (e.g., unlocking the managed device), which may delay remediation, and in turn, may negatively impact the frontline staff. In some elevated instances, the IT administrator's only course of remediation is to remotely erase a managed device, which would require additional subsequent steps to re-configure the erased managed device for further use.

The description provided in the background section should not be assumed to be prior art merely because it is mentioned in or associated with the background section. The background section may include information that describes one or more aspects of the subject technology.

SUMMARY

In particular aspects, the present disclosure provides systems and methods that enable a "manager" or "primary" mobile device to perform selected MDM functions with respect to one or more "managed," "targeted," or "secondary" mobile devices. For example, in an healthcare context, the manager device may be a tablet computer or smart phone operated by a nurse unit manager and the managed devices may be tablet computers or smart phones operated by nurses. By authorizing a nurse unit manager to perform certain MDM functions, an overall mobile device experience in the healthcare environment may be improved. For example, nurse unit managers may no longer have to communicate with IT administrators for relatively minor issues arising on the managed devices. For example, a nurse unit manager may use his or her manager device to unlock the managed device(s).

According to certain aspects of the present disclosure, a computer-implemented method is provided. The method includes generating a unique code for display on a managed device. The method includes authorizing a manager device to selectively initiate at least one workflow on the managed device. The method also includes, responsive to the manager device scanning the unique code displayed on the managed device, verifying the manager device is authorized to selectively initiate at least one workflow on the managed device. The method includes displaying on the manager device, based on verification that the manager device is authorized, an option corresponding to the at least one workflow. The method includes receiving, from the manager device, a selected workflow corresponding to the option selected from the at least one workflow. The method includes, responsive to receiving the selected workflow, transmitting a message to a push notification server, wherein the message initiates the managed device to communicate with a mobile device management server. The method includes transmitting, in response to the managed device communicating with the mobile device management server, a command to the managed device causing performance of the selected workflow on the managed device.

According to other aspects of the present disclosure, a system is provided. The system includes a memory comprising instructions and a processor configured to execute the instructions which, when executed, cause the processor to generate a unique code for display on a managed device. The processor is configured to execute the instructions which, when executed, cause the processor to authorize a manager device to selectively initiate at least one workflow on the managed device. The processor is configured to execute the instructions which, when executed, cause the processor to, responsive to the manager device scanning the unique code displayed on the managed device, verify the manager device is authorized to selectively initiate at least one workflow on the managed device. The processor is configured to execute the instruction which, when executed, cause the processor to display on the manager device, based on verification that the manager device is authorized, an option corresponding to the at least one workflow. The processor is configured to execute the instruction which, when executed, cause the processor to receive, from the manager device, a selected workflow corresponding to the option selected from the at least one workflow. The processor is configured to execute the instruction which, when executed, cause the processor to, responsive to receiving the selected workflow, transmit a message to a push notification server, wherein the message initiates the managed device to communicate with a mobile device management server. The processor is configured to execute the instruction which, when executed, cause the processor to transmit, in response to the managed device communicating with the mobile device management server, a command to the managed device causing performance of the selected workflow on the managed device.

According to other aspects of the present disclosure, a non-transitory machine-readable storage medium comprising machine-readable instructions for causing a processor to execute a method is provided. The method includes generating a unique code for display on a managed device. The method includes authorizing a manager device to selectively initiate at least one workflow on the managed device. The method also includes, responsive to the manager device scanning the unique code displayed on the managed device, verifying the manager device is authorized to selectively initiate at least one workflow on the managed device. The method includes displaying on the manager device, based on verification that the manager device is authorized, an option corresponding to the at least one workflow. The method includes receiving, from the manager device, a selected workflow corresponding to the option selected from the at least one workflow. The method includes, responsive to receiving the selected workflow, transmitting a message to a push notification server, wherein the message initiates the managed device to communicate with a mobile device management server. The method includes transmitting, in response to the managed device communicating with the mobile device management server, a command to the managed device causing performance of the selected workflow on the managed device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 illustrates an example architecture for enabling a manager device to authorize remote workflows on targeted managed devices.

FIG. 3 illustrates an example process for enabling the manager device to authorize remote workflows on managed devices depicting the example manager device, first managed device, second managed device, mobile management server, and push notification service of FIG. 2.

FIGS. 4A1, 4A2, 4A3, 4A4, 4B1, 4B2, 4C, and 4D are example illustrations associated with the example process of FIG. 3.

Figure 2:
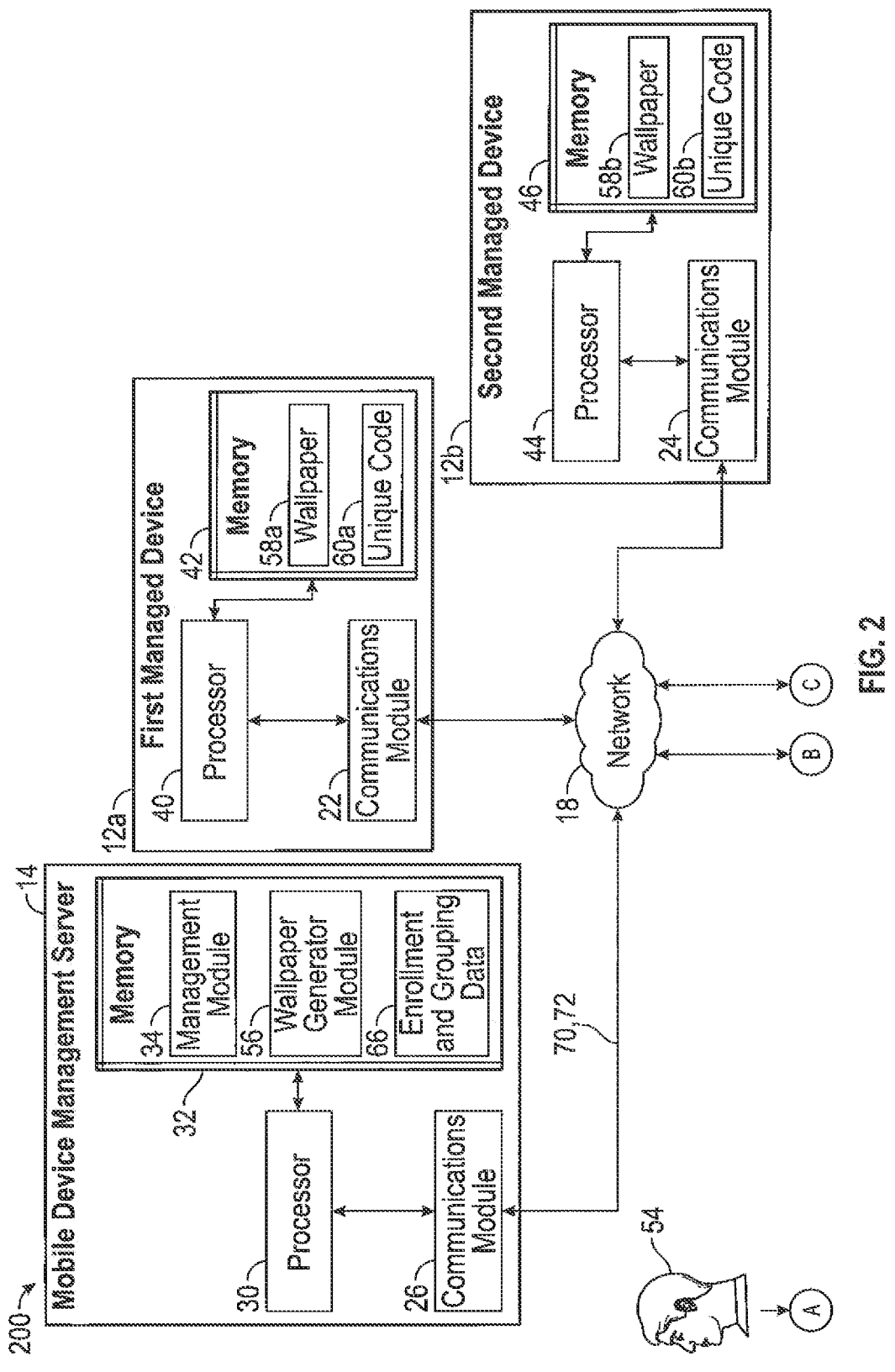
FIG. 2 is a block diagram illustrating the example manager device, managed devices, mobile management server, and push notification service from the architecture of FIG. 1 according to certain aspects of the disclosure.
Figure 2:
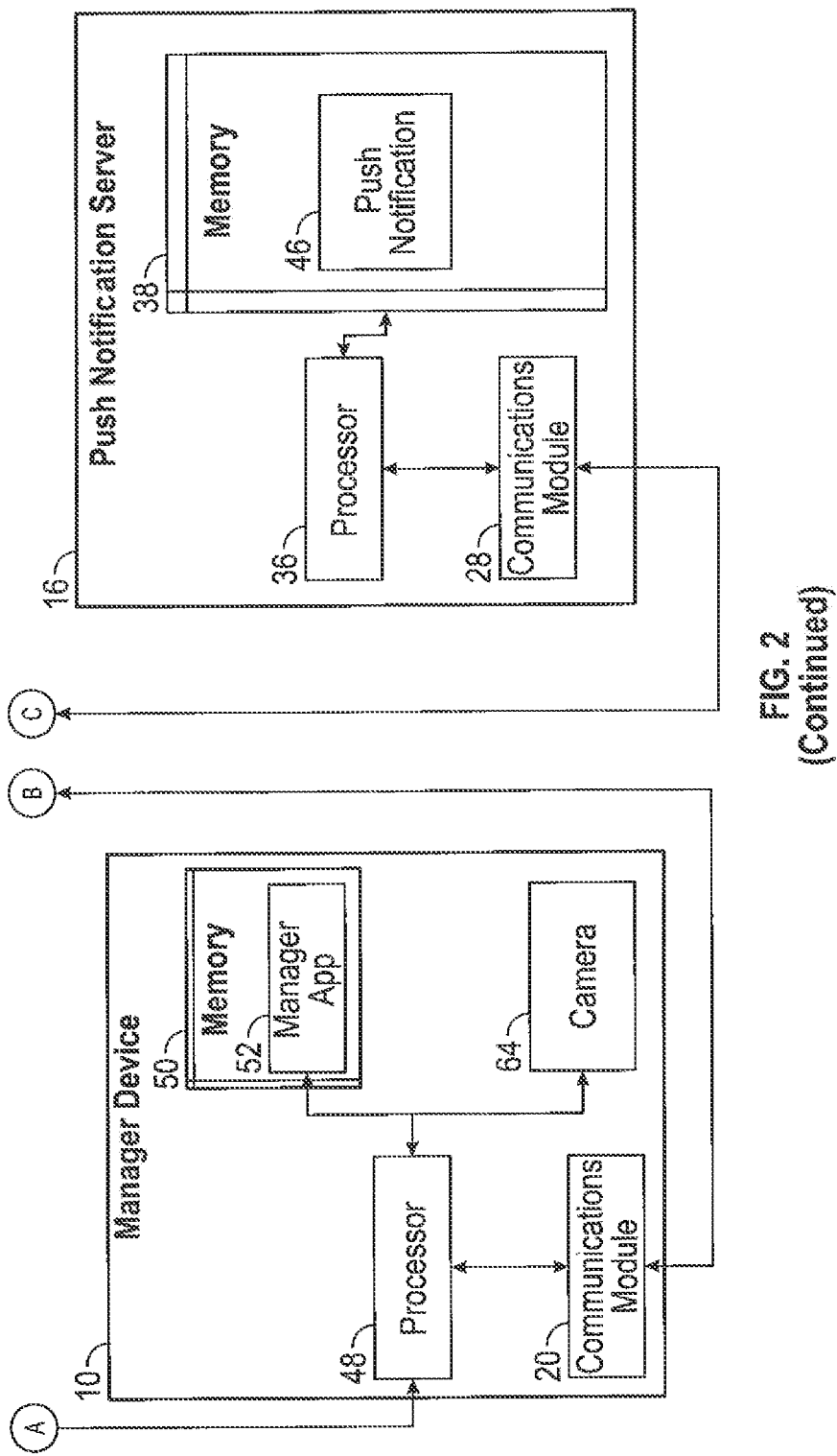

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Within various industry organizations, such as in healthcare and retail, for example, there exists a group of mobile device users or managers who need access to basic mobile device management capabilities over a separate group of managed devices while in the field or on the go. These managers are not IT administrators with direct access to the mobile device management server nor are these managers the end users of the separate group of managed devices. These managers are often in the field and may be referred to as Frontline Managers, Field Managers, Field Service Techs, or other titles associated with managers or individuals who coordinate, use, and supervise managed device for their industry unit. As such, these managers can be characterized as a middle group between the IT administrators and the end users of the managed devices. For example, the business or work function of these managers serve and/or support the end users of the managed devices while also partnering closely with the IT administrators and other teams on service operation of device inventory.

In certain instances while in the field, these managers may need to resolve an issue on a managed device, such as, but not limited to, unlocking the managed device. Under conventional conditions, however, these managers would need to submit an IT ticket to the IT administrator to resolve the issue on the managed device (e.g., unlocking the managed device), which may delay remediation, and in turn, may negatively impact the frontline staff. In some elevated instances, the IT administrator's only course of remediation is to remotely erase a managed device, which would require additional subsequent steps to re-configure the erased managed device for further use.

The disclosed technology provides a solution to such conventionally delayed remediation of the managed device that is having issues. For example, the disclosed technology enables a manager device in the field to authorize remote workflows on managed devices within an environment to resolve issues thereon in a timely manner without having to interact with an IT administrator who would manually perform action.

The disclosed system addresses a technical problem tied to computer technology and arising in the realm of mobile device management, namely the technical problem of timely resolving issues on a managed mobile device. The disclosed system solves this technical problem by securely enabling an authorized manager device to authorize a workflow on a managed mobile device to remediate issues thereon in the field.

For example, in certain aspects, the manager device can scan a QR code or text on a wallpaper of a managed device that is locked to enable the manager device to select a workflow that, in turn, initiates an API call to a mobile management server, which triggers the workflow or command to be performed on the managed device in order to resolve a particular issue.

FIG. 1 illustrates an example architecture 100 for enabling a manager device to control operations of at least one managed device. For example, the architecture 100 includes a manager device 10, at least one managed device 12, such as a first managed device 12a and a second managed device 12b to an nth managed device 12n, a mobile device management server 14, and a push notification service 16 all connected over a network 18. In certain aspects, the mobile device management server 14 may be connected to the push notification service 16 over a separate network.

The mobile device management server 14 can be any device having an appropriate processor, memory, and communications capability for communicating with the manager device 10, the at least one managed device 12, and the push notification service 16. For purposes of load balancing, the mobile device management server 14 may include multiple servers. The push notification service 16 can be any device having an appropriate processor, memory, and communications capability for communicating with the mobile device management server 14 and the at least one managed device 12. The manager device 10, to which the mobile device management server 14 communicates with over the network 18, can be, for example, a tablet computer, a mobile phone, a mobile computer, a laptop computer, a portable media player, an electronic book (eBook) reader, or any other device having appropriate processor, memory, and communications capabilities. Similarly, the at least one managed device 12, such as the first managed device 12*a* and the second managed device 12*b*, to which the mobile device management server 14 communications with over the network 18 via the push notification service 16, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management server 14 and the push notification service 16 can be a cloud computing server of an infrastructure-as-a-service (IaaS) and be able to support a platform-as-a-service (PaaS) and software-as-a-service (SaaS) services.

It should be noted that although one manager device 10 and two managed devices, such as the first managed device 12*a* and the second managed device 12*b* to the nth managed device 12*n*, are shown in FIG. 1, the present disclosure is not limited to any particular configuration or number of devices. In certain aspects, a different number of manager devices and/or managed devices may be present.

The network 18 can include, for example, any one or more of a personal area network (PAN), a local area network (LAN), a campus area network (CAN), a metropolitan area network (MAN), a wide area network (WAN), a broadband network (BBN), the Internet, and the like. Further, the network 18 can include, but is not limited to, any one or more of the following network topologies, including a bus network, a star network, a ring network, a mesh network, a star-bus network, tree or hierarchical network, and the like.

FIG. 2 is a block diagram illustrating examples of the manager device 10, the first managed device 12*a*, the second managed device 12*b*, the mobile device management server 14, and the push notification service 16 in the architecture of FIG. 1 according to certain aspects of the disclosure. It should be understood that for purposes of explanation the first managed device 12*a* and the second managed device 12*b* are described, but any number of the at least one managed device 12 could be used.

The manager device 10, the first managed device 12*a*, the second managed device 12*b*, the mobile device management server 14, and the push notification service 16 are connected over the network 18 via respective communication modules 20, 22, 24, 26, 28. The communication modules 20, 22, 24, 26, 28 are configured to interface with the network 18 to send and receive information, such as data, requests, responses, and commands to other devices on the network 18. The communications modules 20, 22, 24, 26, 28 can be, for example, modems or Ethernet cards.

The mobile device management server 14 includes a processor 30, the communications module 26, and a memory 32 that includes a management module 34. The processor 30 of the mobile device management server 14 is configured to execute instructions, such as instructions physically coded into the processor 30, instructions received from software in the memory 32, or a combination of both.

The push notification service 16 includes a processor 36, the communications module 28, and a memory 38. The processor 36 of the push notification service 16 is configured to execute instructions, such as instructions physically coded into the processor 36, instructions received from software in the memory 38, or a combination of both.

The first managed device 12*a* includes a processor 40, the communications module 22, and a memory 42. The processor 40 of the first managed device 12*a* is configured to execute instructions, such as instructions physically coded into the processor 40, instructions received from software in memory 42, or a combination of both.

The second managed device 12*b* includes a processor 44, the communications module 24, and a memory 46. The processor 44 of the second managed device 12*b* is configured to execute instructions, such as instructions physically coded into the processor 44, instructions received from software in memory 46, or a combination of both.

The manager device 10 includes a processor 48, the communications module 20, and a memory 50 that includes a manager application 52. The processor 48 of the manager device 10 is configured to execute instructions, such as instructions physically coded into the processor 48, instructions received from software in memory 50, or a combination of both. The manager app 52 allows a user 54 of the manager device 10 to enable selected workflows on the at least one managed device 12, such as the first managed device 12*a* and the second managed device 12*b*.

The mobile device management server 14 may correspond to hardware and/or software that implement mobile device management functions. For example, in a healthcare context, the mobile device management server 14 may manage frontline manager devices, field service tech devices, supervisor devices, and nurse devices. As another example, in a retail context, the mobile device management server 14 may manage store manager devices and retail associate devices. Yet another example, in an educational context, the mobile device management server 14 may manage teacher or proctor devices and student or examinee devices. The mobile device management server 14 may store (or access) enrollment and grouping data 66. The enrollment and grouping data 66 may include enrollee data identifying all mobile devices that are managed by the mobile device management server 14, such as data associated with the manager device 10, the first managed device 12*a*, and the second managed device 12*b* to the nth managed device 12*n*.

The wallpaper generator module 56 of the mobile device management server 14 is configured to generate a unique code 60 for display on the at least one managed device 12. In certain aspects, the unique code 60 is a QR code, which can be scanned by the manager device 10. In other aspects, the unique code 60 is a text code, which can be scanned by the manager device 10. In certain other aspects where the unique code 60 is a text code, the code can be read aloud to the user 54 by the user of the at least one managed device 12 such that the user 54 can manually input the text code (e.g., the unique code 60) into the manager app 52 of the manager device 10. In such aspects, another person reading the text code to the user 54 to manually input the text code into the manager device 10 can remove the requirement for proximity of the manager device 10 to the at least one managed device 12. The mobile device management server 14 is configured to authorize the manager device 10 to selectively initiate at least one workflow on the at least one managed device 12. The mobile device management server 14 is configured to, responsive to the manager device 10 scanning the unique code 60 displayed on the at least one managed device 12, verify the manager device 10 is authorized to selectively initiate at least one workflow on the at least one managed device 12. The mobile device management server 14 is configured to display on the manager device 10, based on verification that the manager device 10 is authorized, an option 68 corresponding to the at least one workflow. The mobile device management server 14 is configured to receive, from the manager device 10, a selected workflow corresponding to the option selected from the at least one workflow. The mobile device management server 14 is configured to, responsive to receiving the selected workflow, transmit a message 70 to the push notification server 16. The message 70 initiates the at least one managed device 12 to communicate with a mobile device management server 14. The mobile device management server 14 is configured to transmit, in response to the at least one managed device 12 communicating with the mobile device management server 14, a command 72 to the at least one managed device 12 causing performance of the selected workflow on the at least one managed device 12.

It should be noted that although various embodiments may be described herein with reference to healthcare and educational settings, this is for example only and not to be considered limiting. The teachings of the present disclosure may be applied in other mobile device environments, including but not limited to home environments, corporate environments, retail environments, government environments, organization environments, and other well-known environments.

FIG. 3 illustrates an example process 300 using the manager device 10, the first managed device 12a, the mobile device management server 14, and, in certain aspects, the push notification service 16. While FIG. 3 is described with reference to FIG. 2, it should be understood that the process steps of FIG. 3 may be performed by other systems.

The process 300 begins by proceeding to step 310 when the processor 30 of the mobile device management server 14 via the wallpaper generator module 34 generates a unique code 60a for display on a managed device of the at least one managed device 12, such as the first managed device 12a. In certain aspects, the wallpaper generator module 34 generates a wallpaper 58a which displays the unique code 60a on the first managed device 12a. As depicted at step 312, the processor 30 of the mobile device management server 14 authorizes a manager device 10 to selectively initiate at least one workflow 62 on the first managed device 12a. In certain aspects, the at least one workflow 62 includes at least one workflow such as, but not limited to, a sign out device task, a erase device task, an update inventory task, and an update extension attribute task, and combinations thereof.

As depicted at step 314, responsive to the manager device 10 scanning the unique code 60a displayed on the first managed device 12a, the processor 30 of the mobile device management server 14 verifies that the manager device 10 is authorized to selectively initiate at least one workflow 62 on the first managed device 12a. In certain aspects, the manager device 10 includes a camera 64a, which scans the unique code 60a. Based on verification that the manager device 10 is authorized, the processor 30 of the mobile device management server 14 displays on the manager device 10, via a manager app 52, an option 68 corresponding to the at least one workflow 62, as illustrated at step 316.

At step 318, the processor 30 of the mobile device management server 14 receives a selected workflow from the manager device 10. The selected workflow corresponds to the option 68 corresponding to the at least one workflow 62 that was selected on the manager device 10. Responsive to receiving the selected workflow, the processor 30 of the mobile device management server 14 transmits a message 70 to a push notification server 16, as depicted at step 320. The message 70 initiates the first managed device 12a to communicate with the mobile device management server 14. At step 322, in response to the first managed device 12a communicating with the mobile device management server 14, the processor 30 of the mobile device management server 14, via the management module 34, transmits a command 72 to the managed device 12a, which causes performance of the selected workflow on the managed device 12a.

An example will now be described with reference to the example process 300 of FIG. 3 and the example figures depicted in FIGS. 4A-4D.

In a healthcare environment, for example, a frontline manager, such as a nurse unit manager (e.g., user 54) may be assigned to or associated with the manager device 10, which includes the camera 64 and the manager app 52. In certain aspects, the manager app 52 is pre-installed on the manager device 10. Over the course of a work day, the nurse unit manager may need to resolve issues that occur on a group of managed devices, which are authorized for use to other nurses or employees, such as, for example, the first managed device 12a and the second managed device 12b. In certain aspects, the mobile device management server 14 authorizes the manager device 10 to selectively initiate at least one workflow on the managed devices. In certain aspects, the manager app 52 can only be installed on an authorized manager device 10.

The first managed device 12a displays the wallpaper 58a including the unique code 60a on its lock screen. The wallpaper 58a and the unique code 60a are generated by the wallpaper generator module 56 of the mobile device management server 14. In a similar fashion, the second managed device 12b displays the wallpaper 58b including the unique code 60b on its lock screen. Similarly, the wallpaper 58b and the unique code 60b are generated by the wallpaper generator module 56 of the mobile device management server 14.

As an example, the nurse assigned to the first managed device 12a may have forgotten the passcode required to use the first managed device 12a such that the first managed device 12a is locked. The nurse unit manager, however, can utilize the manager device 10 to unlock the first managed device 12a. In particular, the nurse unit manager can open the manager app 52, as depicted in FIG. 4A1, and use the camera 64 on the manager device 10 to scan the unique code 60a (e.g., QR code) displayed on the wallpaper 58a of the lock screen on the first managed device 12a, as depicted in FIG. 4A2. As a result of scanning the unique code 60a, the mobile device management server 14 verifies whether the manager device 10 is authorized to selectively initiate at least one workflow on the first managed device 12a. After verification that the manager device 10 is authorized, the management module 34 of the mobile device management server 14 causes display, via the manager app 52, of the option 68 of the least one workflow 62 for the nurse unit manager to select, as depicted in FIG. 4A3. In this example, the option 68 displays the workflows of a sign out device task 62a, a erase device task 62b, and an update inventory task 62c of the at least one workflow 62, however, the management module 34 of the mobile device management server 14 is configured to customize the option 68 to display various workflow task(s) as desired (see FIG. 4D). In other aspects, for example, the option 68 can be customized to only display the update inventory task 62c, as depicted in FIG. 4B1, or can be customized to display the erase device task 62b and the update inventory task 62c, as depicted in FIG. 4B2.

Continuing on with the locked first managed device 12a example, the nurse unit manager can select the sign out device task 62a displayed on the manager device 10 to initiate the unlocking of the first managed device 12a. The mobile device management server 14 receives the selected workflow (e.g., the selected option 68 corresponding to the sign out device task 62a) from the first managed device 12a. Responsive to receiving the selected workflow from the manager device 10, the mobile device management server 14 transmits a message 70 (e.g., a notification request) to the push notification server 16 that initiates the first managed device 12a to communicated with the mobile device management server 14.

The push notification server 16 may correspond to one or more network accessible servers that are configured to send push notifications to the first managed device 12a. In a particular embodiment, the push notifications may cause the first managed device 12a to check with the mobile device management server 14 to see if there are any commands to be performed by the managed device 12a. For example, commands (e.g., the command 72) from the mobile device management server 14 may be retrieved by the managed device 12a in response to the push notifications.

Moving on with the locked first managed device 12a example, in response to the first managed device 12a receiving the push notification from the push notification server 16, the first managed device 12a communicates with the mobile device management server 14. With communication between the first managed device 12a and the mobile device management server 14 established, the mobile device management server 14 transmits the command 72 to the first managed device 12a causing performance of the sign out device task 62c (e.g., the selected workflow) on the first managed device 12a. As illustrated in FIG. 4A4, once the sign out device task 62c is successfully performed, a notification 74 is displayed on the manager device 10 to notify success of the selected workflow.

Figure 4C:
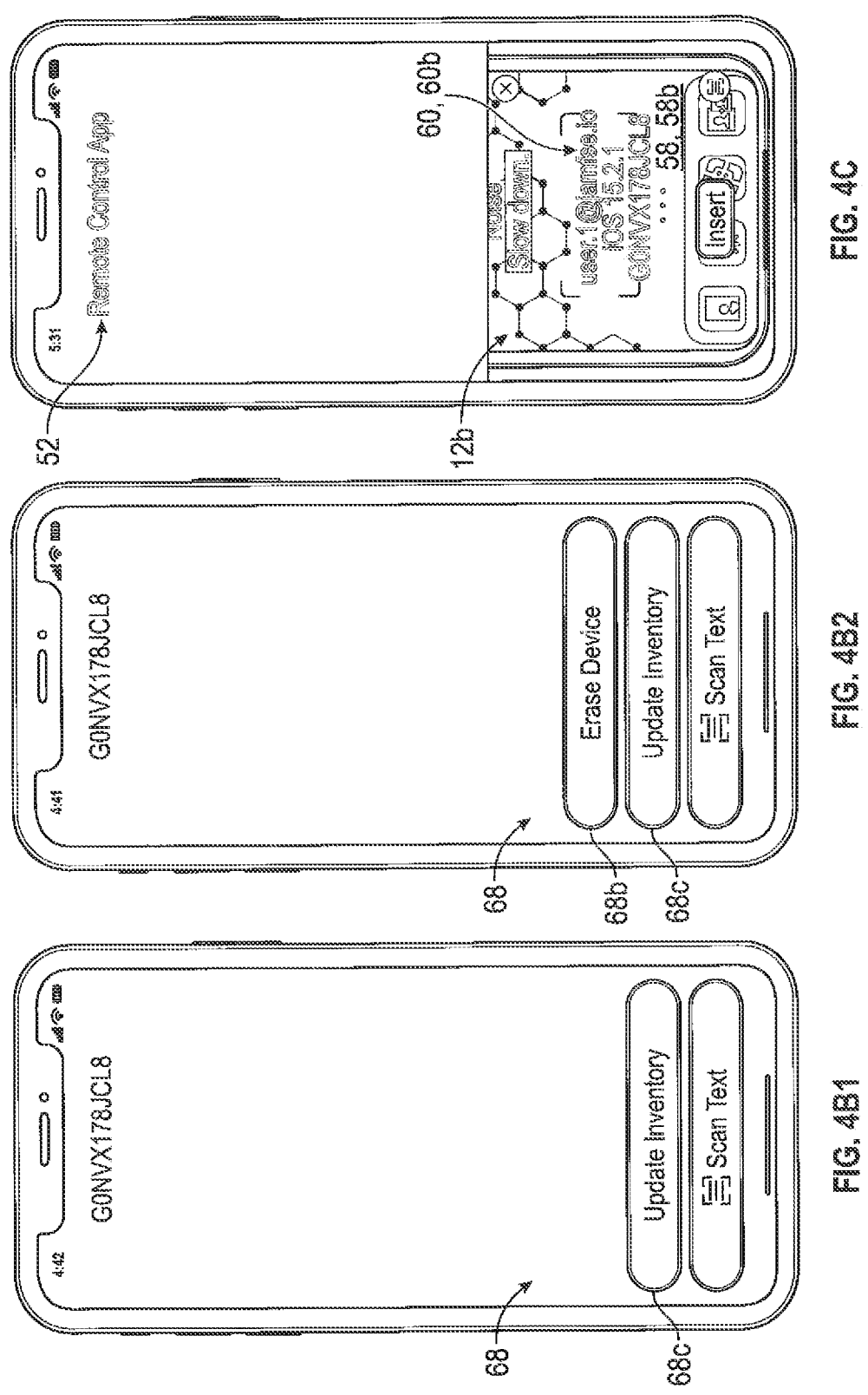
Figure 4D:
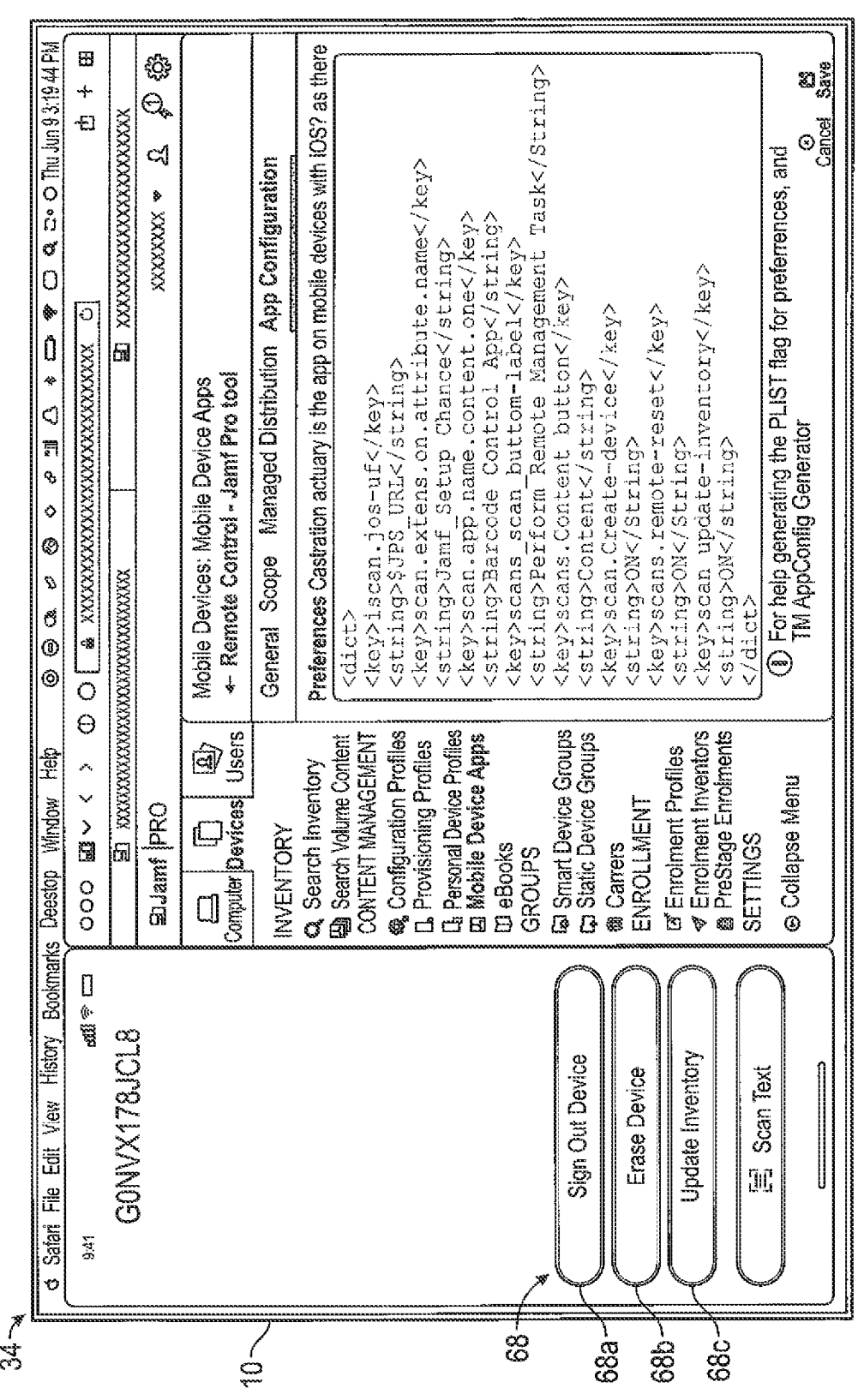

In another example, the nurse unit manager may have to erase the second managed device 12b for security purposes. Here, the nurse unit manager can similarly open the manager app 52 and use the camera 64 on the manager device 10 to scan the unique code 60b (e.g., text code) displayed on the wallpaper 58b of the lock screen on the second managed device 12b, as depicted in FIG. 4C. The nurse unit manager can select the erase device task displayed on the manager device 10 to initiate the erasing of the second managed device 12b and the process will continue in a similar manner as described above in reference to the locked first managed device 12a example.

Although certain embodiments and workflows are described herein with reference to performing mobile device management for a single managed device, it should be understood that mobile device management may also be performed for multiple devices, such as the first managed device 12a and the second managed device 12b to the nth managed device 12n. In certain aspects, for example, the mobile device management server 14 can be configured, via the management module 34, to allow the manager device 10 to select multiple managed devices or a group of managed devices. The management message, such as the message 70, may identify multiple managed devices or a group of managed devices, and the push notification server 16 may send push notifications to each managed device.

Figure 5:
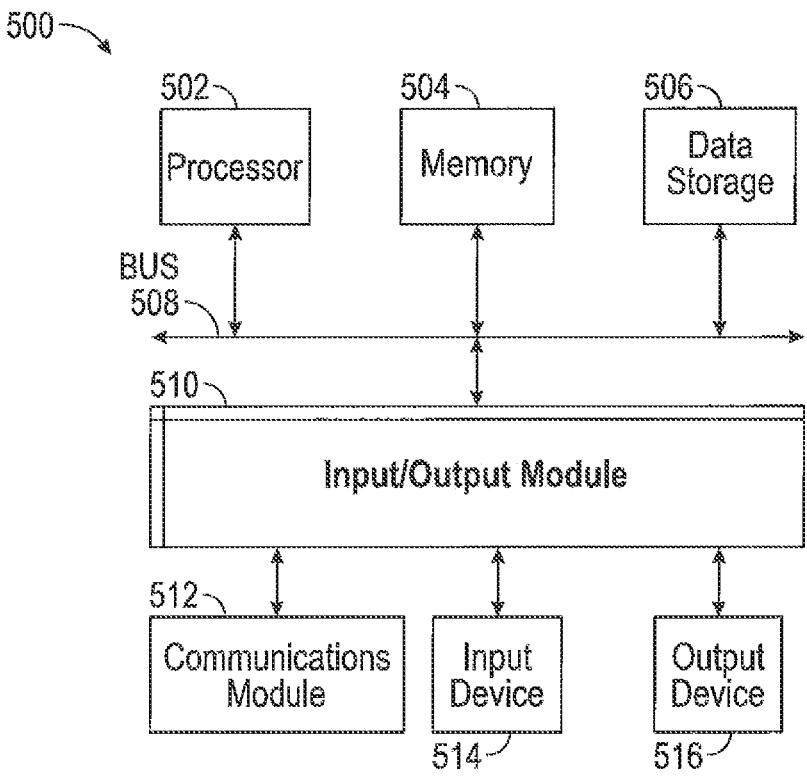
FIG. 5 is block diagram illustrating an example computer system with which the manager device, first managed device, second managed device, mobile management server, and push notification service of FIG. 2 can be implemented.

FIG. 5 is a block diagram illustrating an example computer system 500 with which the manager device 10, the first managed device 12a, the second managed device 12b, the mobile device management server 14, and the push notification service 16 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the manager device 10, the first managed device 12a, the second managed device 12b, the mobile device management server 14, and the push notification service 16) includes a bus 508 or other communication mechanism for communicating information, and a processor 502 (e.g., the processor 30, 36, 40, 44, 48) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 32, 38, 42, 46, 50), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 20, 22, 24, 26, 28) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the manager device 10, the first managed device 12*a*, the second managed device 12*b*, the mobile device management server 14, and the push notification service 16 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
generating a unique code for display on a managed device, wherein the managed device is one of a tablet computer and a mobile phone, wherein the managed device is authorized for use to an employee, and wherein the unique code is displayed on a lock screen wallpaper of the managed device;
assigning a manager device to a manager, wherein the manager device comprises a pre-installed manager app unique to the manager device;
authorizing, via the manager app, the manager device to selectively initiate at least one workflow on the managed device assigned to the employee;
responsive to the manager device scanning, via the manager app, the unique code displayed on the managed device, verifying the manager device is authorized to selectively initiate at least one workflow on the managed device;
displaying on the manager device via the manager app, based on verification that the manager device is authorized, a customizable option corresponding to the at least one workflow, wherein the customizable option is customized to display at least an erase device task of the at least one workflow;
receiving, from the manager device via the manager app, a selected workflow corresponding to the customizable option selected from the at least one workflow;
responsive to receiving the selected workflow, transmitting a message to a push notification server, wherein the message initiates the managed device to communicate with a mobile device management server; and
transmitting, in response to the managed device communicating with the mobile device management server, a command to the managed device causing performance of the selected workflow on the managed device.

2. The computer-implemented method of claim 1, wherein authorizing the manager device to selectively initiate at least one workflow is limited to authorizing the manager device to selectively initiate only one workflow.

3. The computer-implemented method of claim 1, further comprising:

restricting, subsequent to performance of the selected workflow on the managed device, the manager device from initiating further workflows on the managed device.

4. The computer-implemented method claim 1, wherein the unique code is one of a QR code and a text code.

5. The computer-implemented method of claim 1, wherein the at least one workflow further comprises one of a sign out device task, an update inventory task, and an update extension attribute task.

6. The computer-implemented method of claim 1, wherein the selected workflow is a sign out device task, wherein the command to the managed device causes clearing of a passcode on the managed device and launching a reset app on the managed device.

7. The computer-implemented method of claim 1, wherein the selected workflow is an erase device task, wherein the command to the managed device causes one of erasing the managed device and configuring a lost mode state on the managed device.

8. The computer-implemented method of claim 1, wherein the selected workflow is an update inventory task, wherein the command to the managed device causes updating an inventory of the managed device.

9. The computer-implemented method of claim 1, wherein the selected workflow is an update extension attribute task, wherein the command to the managed device causes updating an extension attribute of the managed device.

10. A system comprising:
a memory comprising instructions; and
a processor configured to execute the instructions which, when executed, cause the processor to:
   generate a unique code for display on a managed device, wherein the managed device is one of a tablet computer and a mobile phone, wherein the managed device is authorized for use to an employee, and wherein the unique code is displayed on a lock screen wallpaper of the managed device;
   assign a manager device to a manager, wherein the manager device comprises a pre-installed manager app unique to the manager device;
   authorize, via the manager app, the manager device to selectively initiate at least one workflow on the managed device assigned to the employee;
   responsive to the manager device scanning, via the manager app, the unique code displayed on the managed device, verify the manager device is authorized to selectively initiate at least one workflow on the managed device;
   display on the manager device via the manager app, based on verification that the manager device is authorized, a customizable option corresponding to the at least one workflow, wherein the customizable option is customized to display at least an erase device task of the at least one workflow;
   receive, from the manager device via the manager app, a selected workflow corresponding to the customizable option selected from the at least one workflow;
   responsive to receiving the selected workflow, transmit a message to a push notification server, wherein the message initiates the managed device to communicate with a mobile device management server; and
   transmit, in response to the managed device communicating with the mobile device management server, a command to the managed device causing performance of the selected workflow on the managed device.

11. The system of claim 10, wherein the manager device is authorized to selectively initiate only one workflow.

12. The system of claim 10, further comprising instructions to cause the processor to:
   restrict, subsequent to performance of the selected workflow on the managed device, the manager device from initiating further workflows on the managed device.

13. The system of claim 10, wherein the unique code is one of a QR code and a text code.

14. The system of claim 10, wherein the at least one workflow comprises one of a sign out device task, an update inventory task, and an update extension attribute task.

15. A non-transitory machine-readable storage medium comprising machine-readable instructions for causing a processor to execute a method, the method comprising:
   generating a unique code for display on a managed device, wherein the managed device is authorized for use to an employee, and wherein the unique code is displayed on a lock screen wallpaper of the managed device;
   assigning a manager device to a manager, wherein the manager device comprises a pre-installed manager app unique to the manager device;
   authorizing, via the manager app, the manager device to selectively initiate at least one workflow on the managed device assigned to the employee, wherein the managed device is one of a tablet computer and a mobile phone;
   responsive to the manager device scanning, via the manager app, the unique code displayed on the managed device, verifying the manager device is authorized to selectively initiate at least one workflow on the managed device;
   displaying on the manager device via the manager app, based on verification that the manager device is authorized, a customizable option corresponding to the at least one workflow, wherein the customizable option is customized to display at least an erase device task of the at least one workflow;
   receiving, from the manager device via the manager app, a selected workflow corresponding to the customizable option selected from the at least one workflow; responsive to receiving the selected workflow, transmitting a message to a push notification server, wherein the message initiates the managed device to communicate with a mobile device management server; and transmitting, in response to the managed device communicating with the mobile device management server, a command to the managed device causing performance of the selected workflow on the managed device.

16. The non-transitory machine-readable storage medium of claim 15, wherein authorizing the manager device to selectively initiate at least one workflow is limited to authorizing the manager device to selectively initiate only one workflow.

17. The non-transitory machine-readable storage medium of claim 15, further including instructions for causing the processor to execute the method comprising:
   restricting, subsequent to performance of the selected workflow on the managed device, the manager device from initiating further workflows on the managed device.

18. The non-transitory machine-readable storage medium of claim 15, wherein the at least one workflow comprises one of a sign out device task, an update inventory task, and an update extension attribute task.

* * * * *